US007912888B2

United States Patent
Uchida (10) Patent No.: US 7,912,888 B2
(45) Date of Patent: Mar. 22, 2011

(54) ROUNDING COMPUTING METHOD AND COMPUTING DEVICE THEREFOR

(75) Inventor: Wataru Uchida, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 1041 days.

(21) Appl. No.: 11/724,207

(22) Filed: Mar. 15, 2007

(65) Prior Publication Data
US 2007/0239817 A1    Oct. 11, 2007

(30) Foreign Application Priority Data

Apr. 7, 2006    (JP) .................................. 2006-105931

(51) Int. Cl.
*G06F 7/38*    (2006.01)
(52) U.S. Cl. ....................................................... 708/551
(58) Field of Classification Search ........................ None
See application file for complete search history.

(56) References Cited

U.S. PATENT DOCUMENTS

| 5,644,522 | A  | * | 7/1997 | Moyse et al. ................. 708/551 |
| 6,233,672 | B1 | * | 5/2001 | Lynch ........................... 712/222 |
| 6,360,204 | B1 |   | 3/2002 | Li et al. |
| 2001/0023425 | A1 | * | 9/2001 | Oberman et al. ............. 708/620 |

* cited by examiner

*Primary Examiner* — David H Malzahn
(74) *Attorney, Agent, or Firm* — Studebaker & Brackett PC; Donald R. Studebaker (57) ABSTRACT

A computing device has a rounding processor that inputs therein a set of plural (K) input data IN1 through INK comprising z bits. The rounding processor selects an ensured bit field depending upon the state of usage of each of specific areas A of upper z/2 bits of the 32-bit input data IN1 through INK and rounds the corresponding input data to z/2. As a result of rounding processing, shift information SHIFT of lower (16−n) bits of each discarded non-specific area B is stored in a memory area. D10-1 through D10-K of the rounded respective 16 bits are subjected to multiplication by a multiplier. A digit adjuster shifts multiplication results to the left on the basis of the shift information SHIFT respectively stored in the memory areas to adjust digits.

3 Claims, 10 Drawing Sheets

ROUNDING COMPUTING METHOD AND COMPUTING DEVICE THEREFOR

BACKGROUND OF THE INVENTION

The present invention relates to a rounding computing method for improving accuracy of a computational result and speeding up an arithmetic operation, using a low-accuracy multiplier at fixed-point arithmetic and a computing device therefor.

A decoder for decoding an MP3 (MPEG-1 Audio Layer 3) corresponding to an audio compression technology has conventionally been in need of high-speed multiplication processing.

Figure 2:
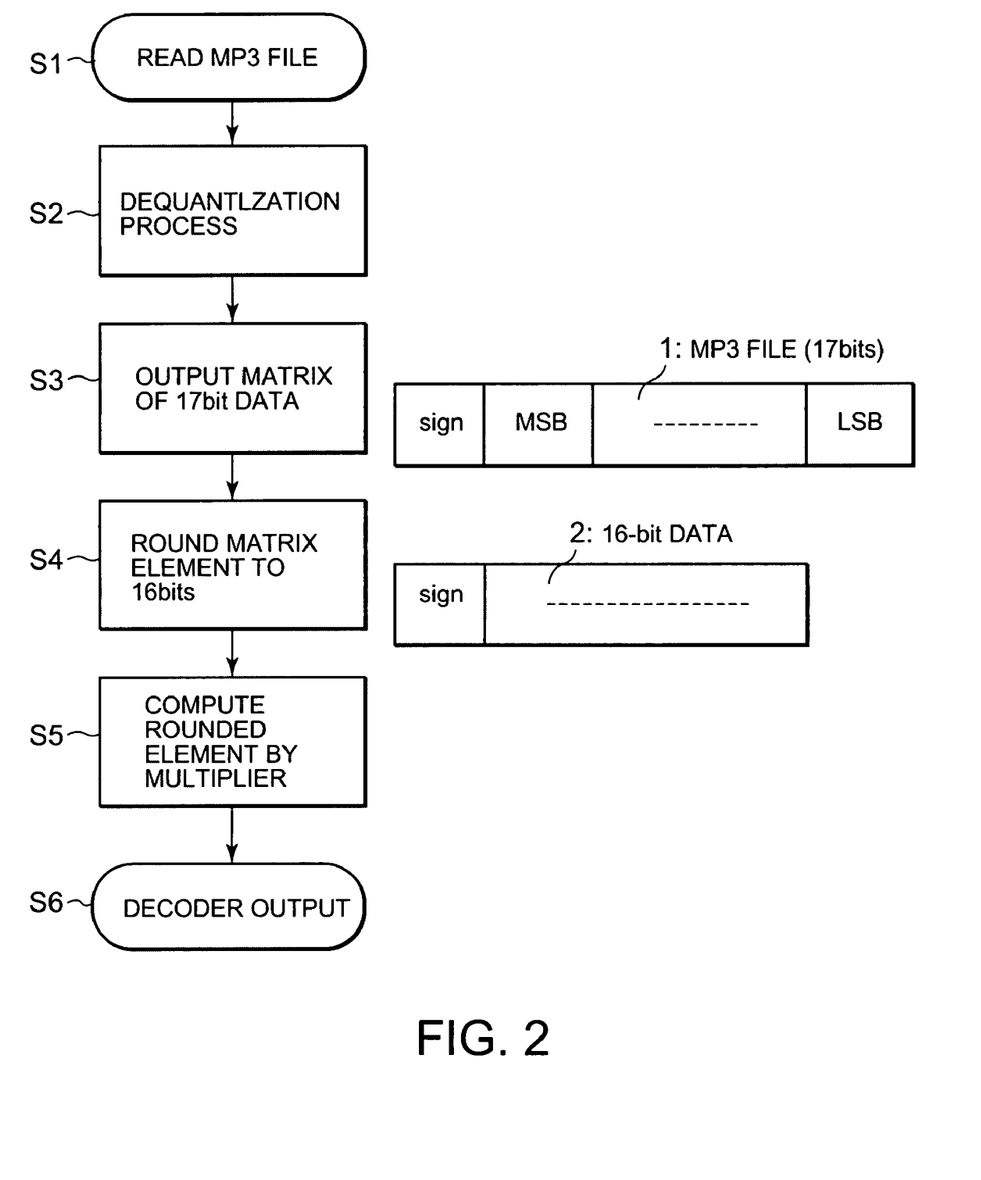
FIG. 2 is a diagram showing a flow of processing for decoding a conventional MP3 file.

FIG. 2 is a diagram showing a flow of processing for decoding a conventional MP3 file. Upon decoding of an MP3, an unillustrated decoder performs dequantization processing (Step S2) for generating matrix data meaningful as a physical quantity on the basis of data read from the MP3 file 1 of 17 binary digits (hereinafter called "bits")(Step S1). The decoder needs to round elements of each matrix of 17 bits obtained by dequantization to 16-bit data 2 (i.e., bring the same into integer form) (Step S4) in order to input the same to an unillustrated high-speed 16-bit multiplier (Step S3). To this end, the most significant bit (hereinafter called "MSB") or the least significant bit (hereinafter called "LSB") of the MP3 file 1 must be discarded. The rounded data is computed by the multiplier (Step S5), which in turn is outputted from the decoder (Step S6).

Incidentally, when the LSB is discarded upon the previously mentioned process of rounding the data to 16 bits (Step S4), the accuracy of the data is deteriorated. On the other hand, when the MSB is discarded, data is rounded to an unintentioned numerical value where the data is used to the MSB in full, so that there is a fear that a decoded sound is distorted.

A method for solving such a rounding problem has been proposed in a conventional patent document 1 (U.S. Pat. No. 6,360,204B1).

Figure 3:
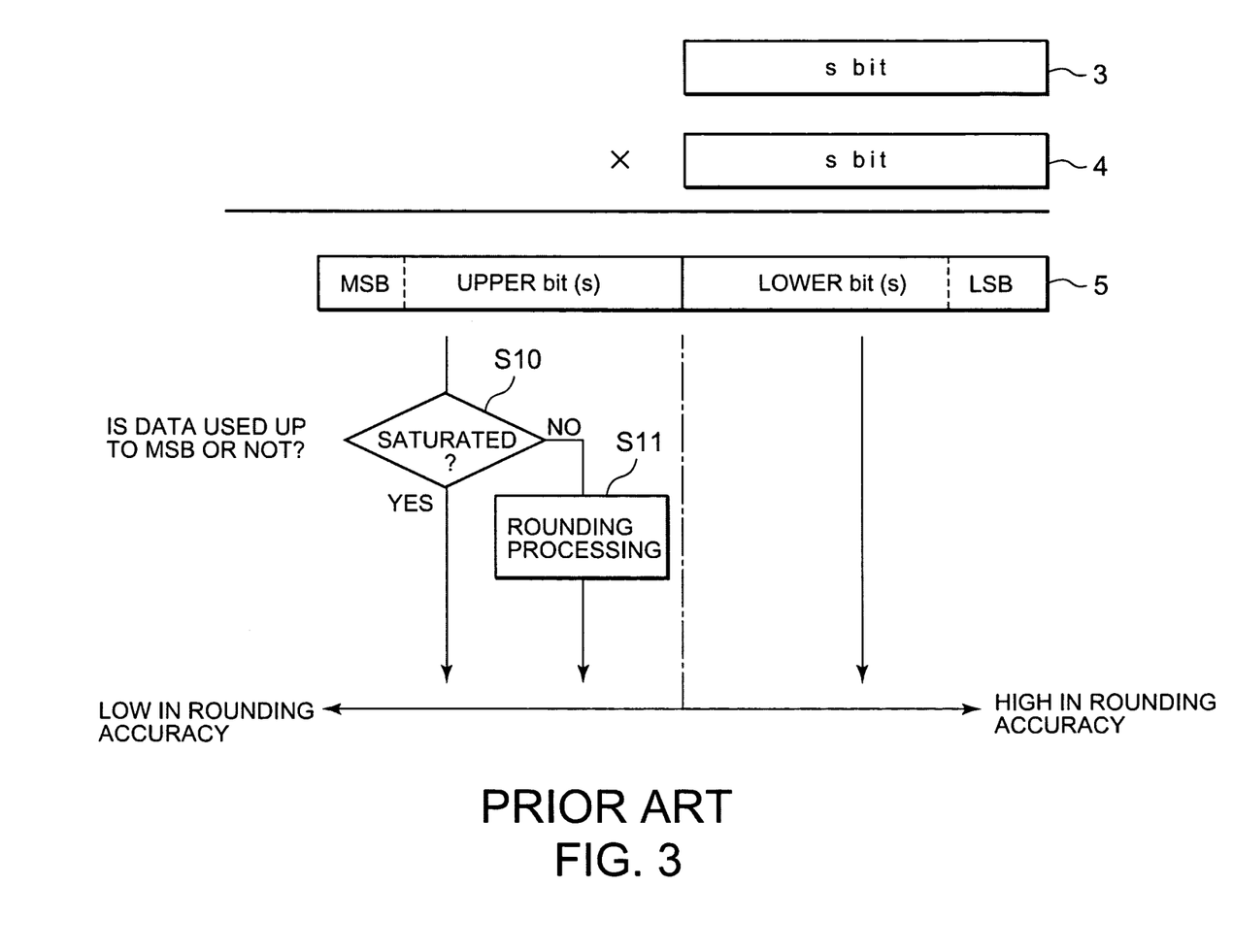
FIG. 3 is a diagram showing a rounding computing method described in the conventional patent document 1.

FIG. 3 is a diagram showing the rounding computing method described in the conventional patent document 1.

In the present rounding computing method, rounding processing is contrived in the following manner to improve the accuracy of an audio decoder.

A result of multiplication using audio data by a digital signal processor (hereinafter called "DSP") in which a multiplier factor 3 and a multiplicand 4 are respectively s bits, becomes 2s bits at a maximum. Therefore, the multiplication result is rounded to s bits in the following procedure.

Either upper s bits of the multiplication result 5 or lower s bits thereof to be ensured is first selected. In general, the process of rounding off upper bits is low in rounding accuracy, and the process of rounding off lower bits is high in rounding accuracy. These selecting methods are optional. Next, when the upper s bits are ensured, the presence or absence of saturation of data (that is, whether the data is used up to the MSB) is confirmed (Step S10). If the answer is found to be NO, then rounding processing is executed (Step S11). If the answer is found to be YES, then no rounding processing is done.

According to the conventional computing method, the accuracy of the audio decoded mounted to the s-bit DSP can be improved. There is, however, a problem in that the selectable accuracy is limited to the two types where the upper bits are ensured and the lower bits are ensured as shown in FIG. 3. An application is also limited to the audio decoder.

That is, in the conventional rounding computing method or computing device, for example, a general-purpose microprocessor (hereinafter called "MCU") encounters difficulties in speeding up multiplication using a low-accuracy multiplier reduced in the number of bits and at the same time selecting and ensuring the accuracy of computational or operational data with flexibility. Further, it was difficult to make it possible to apply a target application without being limited to the audio decoder.

SUMMARY OF THE INVENTION

With the foregoing in view, it is therefore an object of the present invention to provide a rounding computing method for speeding up computational processing and ensuring computational output accuracy, using a high-speed low-accuracy multiplier, and a computing device therefor.

According to the invention according to a first aspect, there is provided a rounding computing method comprising the steps of determining whether a specific area of upper n bits (where $z>n\geq2$) of input data comprising z bits (where $z\geq2$) is being used; when the specific area is not used in the result of determination, discarding the upper n nits and lower ($z/2-n$) bits in the input data and rounding the corresponding data to z/2-bit values; and when the specific area is used in the result of determination, discarding lower z/2 bits in the input data and rounding the corresponding data to z/2 bits.

A computing device of the invention according to a fourth aspect, using the rounding computing method according to the first aspect includes a rounding processing means, a memory means, a z/2-bit multiplier and a digit adjusting means.

The rounding processing means inputs therein multiplier factors and multiplicands respectively constituted of z bits (where $z\geq2$), determines whether specific areas of respective upper n bits (where $z>n\geq2$) of the multiplier factors and the multiplicands are respectively being used, discards the upper n bits and lower ($z/2-n$) bits in the multiplier factors and the multiplicands if the specific areas are not used and rounds the corresponding multiplier factors and multiplicands to z/2 bits respectively, and discards lower z/2 bits in the multiplier factors and the multiplicands if the specific areas are used and rounds the corresponding multiplier factors and multiplicands to z/2 bits respectively. The memory means stores information about the discarded respective numbers of bits respectively. The z/2-bit multiplier performs multiplication on the multiplier factors and multiplicands rounded by the rounding processing means and outputs multiplication results therefrom. Further, the digit adjusting means shifts the multiplication results on the basis of the number-of-bits information stored in the memory means to adjust digits.

Thus, the computing method according to the first aspect or the computing device according to the fourth aspect selects an ensured bit field (plural bits) depending on the condition of an upper bit field or a lower bit field upon rounding processing. Further, the rounding method or computing device makes it possible to adjust accuracy depending on applications thereby to speed up computational processing using a high-speed low-accuracy multiplier and ensure computational output accuracy.

According to the invention according to a second aspect, there is provided a rounding computing method comprising the steps of determining how many bits a specific area of upper z/2 bits of input data comprising z bits (where $z\geq2$) uses, and if the specific area uses x bits (where $0\leq x\leq z/2$) in the input data, discarding upper $(z/2-x)$ bits and lower x bits in the input data and rounding the corresponding data to $z/2$ bits.

A computing device of the invention according to a fifth aspect, using the rounding computing method according to the second aspect includes a rounding processing means, a memory means, a $z/2$-bit multiplier and a digit adjusting means.

The rounding processing means inputs therein multiplier factors and multiplicands respectively constituted of z bits ($z \geq 2$), determines at what bits specific areas of respective upper $z/2$ bits of the multiplier factors and the multiplicands are being used, discards upper $(z/2-x)$ bits and lower x bits in the multiplier factors and the multiplicands if the specific areas use x bits (where $0 \leq x \leq 2$), and rounds the corresponding multiplier factors and multiplicands to $z/2$ bits respectively. The memory means stores information about the discarded respective numbers of bits therein respectively. The $z/2$-bit multiplier performs multiplication on the multiplier factors and multiplicands rounded by the rounding processing means and outputs multiplication results therefrom. The digit adjusting means shifts the multiplication results on the basis of the number-of-bits information stored in the memory means to adjust digits.

Thus, the computing method according to the second aspect or the computing device according to the fifth aspect dynamically varies the range of each ensured lower bit field (plural bits) depending on the condition upon rounding processing thereby to speed up computational processing using a high-speed low-accuracy multiplier and ensure computational output accuracy.

According to the invention according to a third aspect, there is provided a rounding computing method comprising the steps of detecting at what bits specific areas of upper $z/2$ bits of a plurality of input data respectively comprising z bits (where $z \geq 2$) are used in the input data and thereby determining the maximum value x (where $0 \leq x \leq z/2$) of the used number of bits; and discarding upper $(z/2-x)$ bits and lower x bits in the respective input data and rounding the data to $z/2$ bits respectively.

A computing device of the invention according to a sixth aspect, using the rounding computing method according to the third aspect includes a rounding processing means, a memory means, a $z/2$-bit multiplier and a digit adjusting means.

The rounding processing means inputs therein a plurality of multiplier factors and multiplicands respectively constituted of z bits (where $z \geq 2$), detects at what bits specific areas of respective upper $z/2$ bits of the plurality of multiplier factors and multiplicands are being used, thereby determining the maximum value x (where $0 \leq x \leq z/2$) of the used number of bits, discards upper $(z/2-x)$ bits and lower x bits in the multiplier factors and the multiplicands and rounds the corresponding multiplier factors and multiplicands to $z/2$ bits respectively. The memory means stores information about the discarded respective numbers of bits therein respectively. The $z/2$-bit multiplier performs multiplication on the multiplier factors and multiplicands rounded by the rounding processing means and outputs multiplication results therefrom. The digit adjusting means shifts the multiplication results on the basis of the number-of-bits information stored in the memory means to adjust digits.

Thus, the computing method according to the third aspect or the computing device according to the sixth aspect holds the rounded number of bits in calculation units upon rounding processing to thereby ensure computational output accuracy and reduce storage capacity.

According to the invention according to each of the first and fourth aspects, the following (i) through (iii) effects are brought about.

(i) Since rounding processing is contrived, the accuracy of each computational result can be ensured.

(ii) Since a desired ($z/2$-bit) multiplier can be used, for example, a processor capable of executing a $z/2$-bit sum-of-products computation at high speed can be speeded up.

(iii) Adjusting the number of bits of each bit field to be ensured makes it possible to ensure accuracy consistent or matched with an application.

According to the invention according to each of the second and fifth aspects, effects similar to the effects (i) and (ii) according to the first and fourth aspects are brought about. Further, dynamically varying the number of bits to be ensured makes it possible to ensure accuracy allowable for the number of bits. It is therefore possible to improve the accuracy of each computational result by the multiplier as compared with the invention according to each of the first and fourth aspects.

According to the invention according to each of the third and sixth aspects, effects similar to the effects (i) and (ii) according to the invention according to each of the first and fourth aspects are brought about. Further, since shift information are collectively managed every calculation unit, memory capacity can be reduced as compared with the invention according to each of the second and fifth aspects.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

DETAILED DESCRIPTION OF THE PREFERRED EMBODIMENTS

Preferred embodiments of the present invention will hereinafter be described with reference to the accompanying drawings.

In a rounding computing method based on fixed-point arithmetic, a decision as to whether a specific area of upper n bits (where $z>n \geq 2$) of input data comprising z bits (where $z \geq 2$) is being used, is made. If the specific area is not used, then the upper n nits and lower (z/2−n) bits in the input data are discarded and the corresponding data is rounded to z/2-bit values. If the specific area is used, then lower z/2 bits in the input data are discarded and the corresponding data is rounded to z/2 bits.

First Preferred Embodiment

Configuration of First Embodiment

Figure 1:
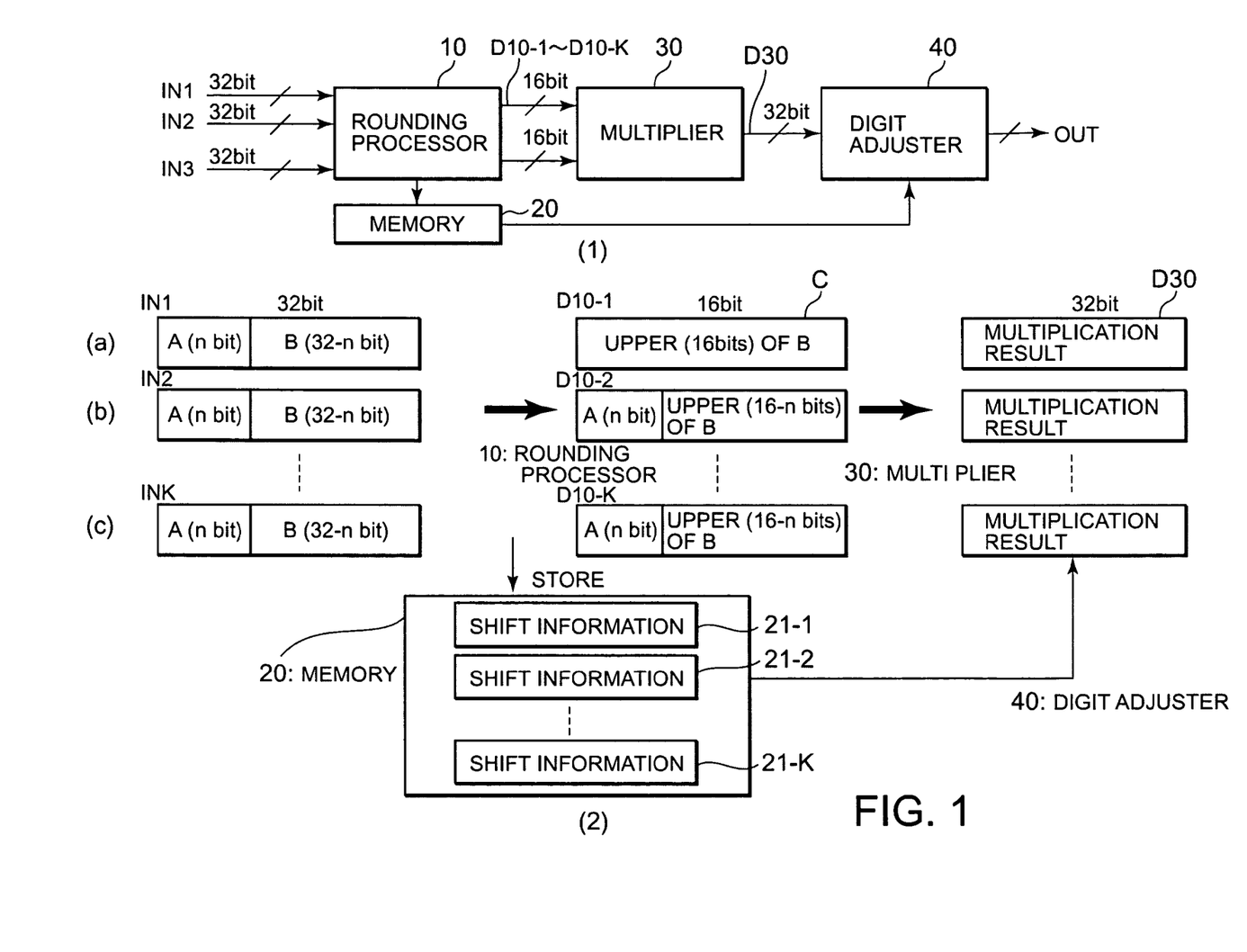
FIG. 1 is a diagram for describing a computing device showing a first embodiment of the present invention.

FIGS. 1(1) and 1(2) are diagrams for describing a computing device showing a first embodiment of the present invention. The same FIG. (A) is a schematic configuration diagram and the same FIG. (B) is a diagram showing the contents of processing.

The computing device is a device that performs multiplication of fixed-point arithmetic used in an application for decoding of MP3. The computing device has a rounding processing means (e.g., rounding processor) 10 which inputs therein a set of input data IN1 through INK consisting of a plural (K) z bits (e.g., 32 bits). The rounding processor 10 has the function of selecting a secured bit field C depending upon the state of use of each of specific areas A of upper n bits (fixed values) of the respective 32-bit input data IN1 through INK and rounding it to z/2 (e.g., 16 bits).

That is, the rounding processor 10 has the function of determining whether the specific area A of the upper n bits is used in each of the input data IN1 through INK and, if it is found that the specific area A is not used ((a) of FIG. 1(2)), discarding the specific area A of the upper n bits and lower (z/2−n=16−n) bits of the remaining non-specific areas B of (32−n) bits and selecting a bit field C to be ensured and rounding it to 16-bit values, and, if the specific area A is used ((b) of FIG. 1(2)), discarding lower 16 bits of a non-specific area B and selecting a bit field C to be ensured and rounding it to 16-bit values.

A memory means (e.g., memory) 20, and a z/2 bit (e.g., 18-bit) multiplier 30 are connected to such a rounding processor 10. Further, a digit adjusting means (e.g., digit adjuster) 40 is connected to the memory 20 and the multiplier 30.

The memory 20 has a plurality of (K) memory areas 21-1 through 21-K for storing respective information (i.e., information on bit widths) on the number of bits discarded upon rounding as shift information SHIFT. The 18-bit multiplier 30 is a circuit which multiplies 16-bit data taken as multiplier factors, of the rounded plural 16-bit data D10-1 through D10-K by 16-bit data taken as multiplicands, of the 16-bit data D10-1 through D10-K, respectively and outputs multiplication results D30 of respective 32 bits to the digit adjuster 40. The digit adjuster 40 shifts the multiplication results D30 respectively on the basis of the respective shift information SHIFT stored in the memory areas 21-1 through 21-K to adjust digits.

Each of the rounding processor 10 and the digit adjuster 40 is constituted of an arithmetic and logic unit (hereinafter called "ALU") or a shifter or the like.
(Multiplication Processing Including Rounding Computing Method According to First Embodiment)

Figure 4:
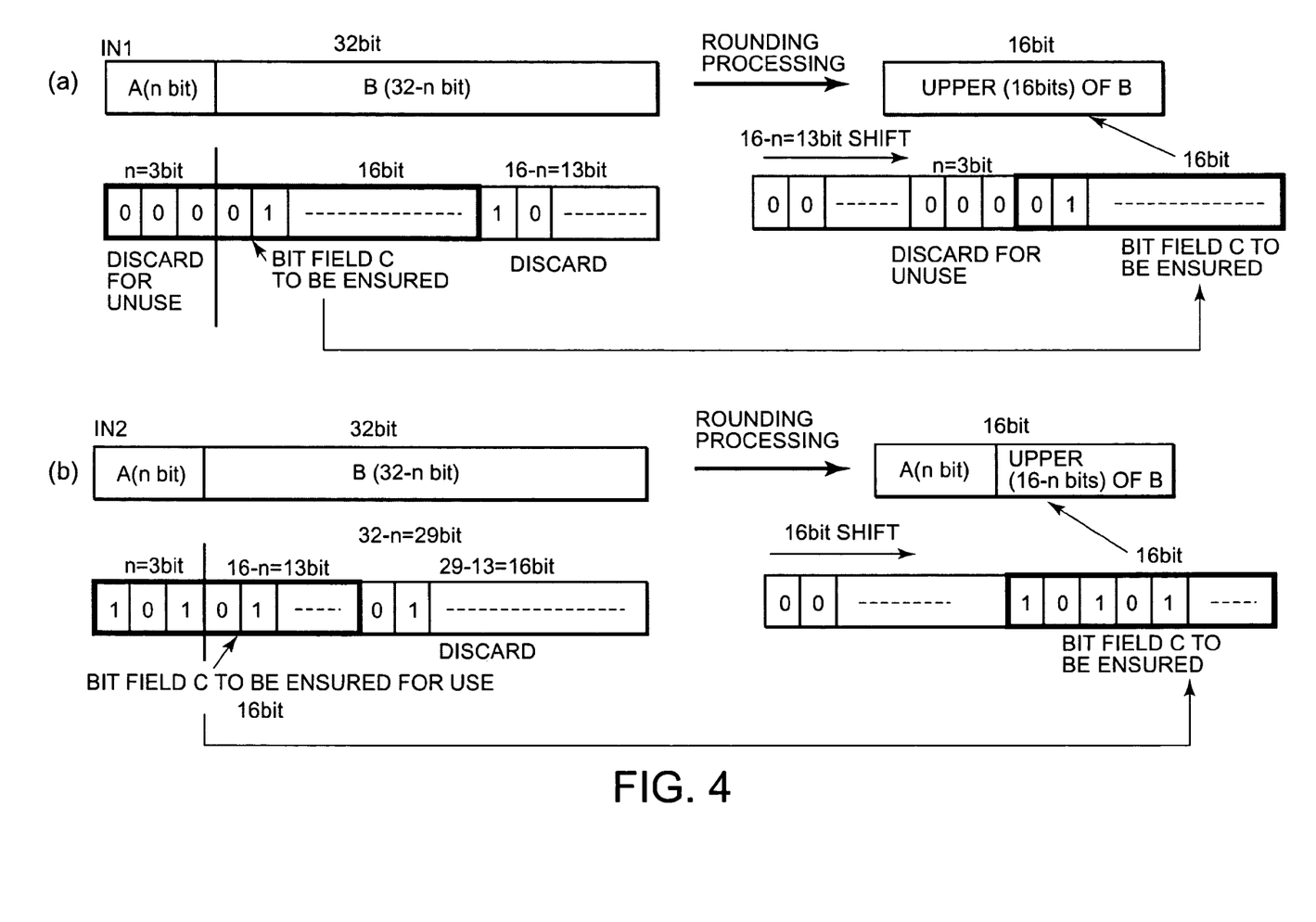
FIG. 4 is an explanatory diagram illustrating a rounding computing method at each of (a) and (b) of FIG. 1(2)
Figure 5:
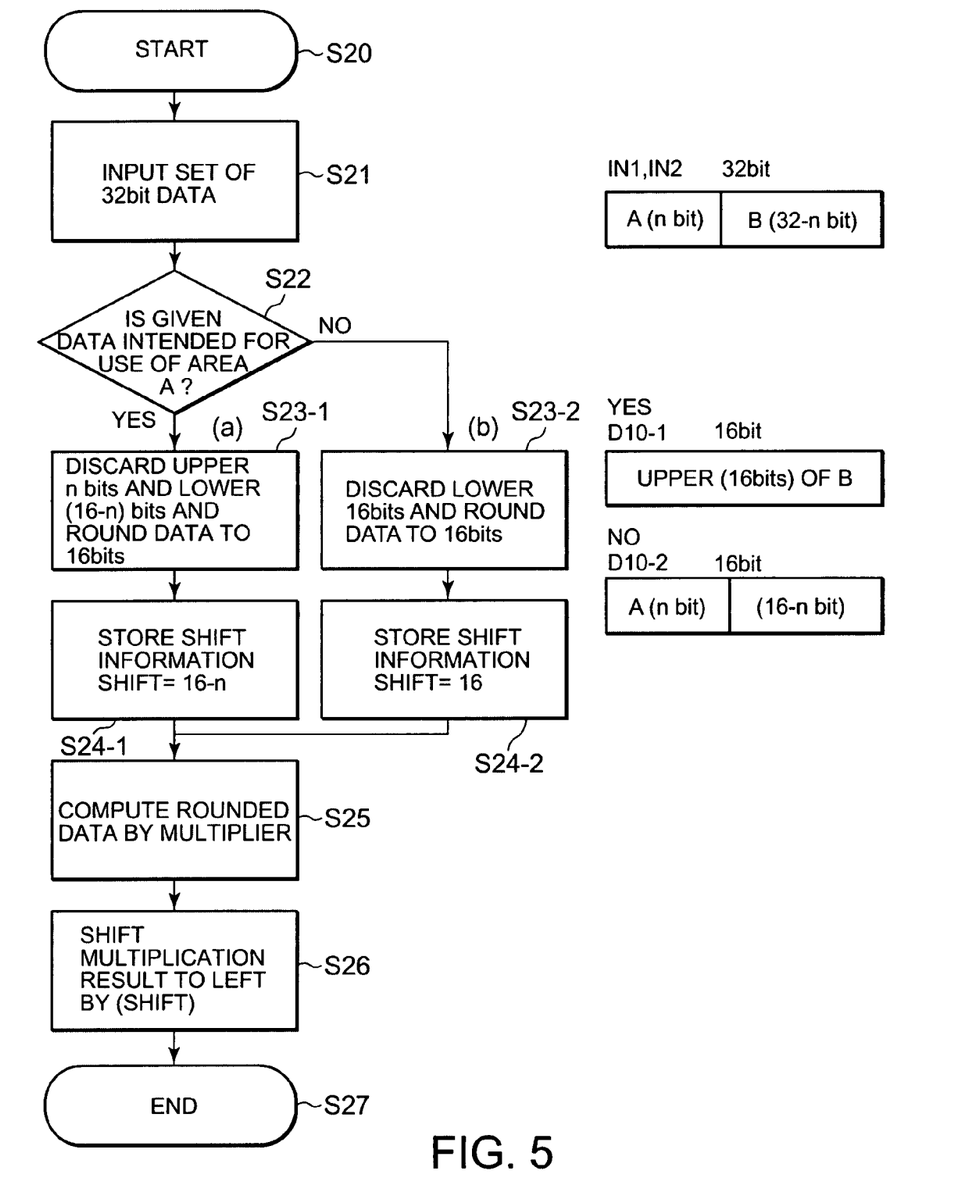
FIG. 5 is a flowchart showing multiplication processing including a rounding computing method of FIG. 1.

FIG. 4 is an explanatory diagram showing a rounding computing method at each of (a) and (b) of FIG. 1(2). FIG. 5 is a flowchart showing multiplication processing including the rounding computing method of FIG. 1.

The multiplication processing for the set of the 32-bit input data IN1 through INK is executed in the following manner in accordance with the flowchart of FIG. 5.

When the multiplication processing is started (Step S20) and the set of 32-bit input data IN1 through INK is inputted to the rounding processor 10 (Step S21), the rounding processor 10 determines whether each of given input data (e.g., IN1 and IN2) makes use of a specific area A of upper n bits (e.g., 3 bits) (Step S22). The rounding processor 10 performs rounding processing, based on the result of determination (Steps S23-1 and S23-2).

If it is found that the input data IN1 does not use the specific area A of the upper n bits (=3 bits) as shown in FIG. 4(a), for example ("000"), then the upper n bits (=3 bits) and lower (16−n) bits (=13 bits) of a non-specific area B are discarded (i.e., "0" is inserted from MSB (and the data is shifted to the right by 16−n=13 bits)) and a bit field C to be ensured is selected and rounded to 16-bit values (Step S23-1).

On the other hand, if it is found that the input data IN2 uses the specific area A of the upper n bits (=3 bits) as shown in FIG. 4(b) ("101"), then lower 16 bits of a non-specific area B are discarded (i.e., "0" is inserted from MSB and the data is shifted to the right by 16 bits), and a bit field C to be ensured is selected and rounded to 16-bit values (Step S23-2).

As a result of the rounding processing in FIG. 4(a), shift information SHIFT about the discarded lower (16−n)=13 bits of non-specific area B is stored in the memory area 21-1 (Step S24-1). As a result of the rounding processing in FIG. 4(b), shift information SHIFT about the discarded lower 16 bits of non-specific area B is stored in the memory area 21-2 (Step S24-2).

Other input data IN3 through INK are also subjected to rounding processing in like manner. Since the memory areas 21-1 through 21-K are prepared by the number corresponding to the input data IN1 through INK, shift information SHIFT associated with the input data IN1 through INK are individually stored in the memory areas 20-1 through 20-K.

Data D10-1 through D10-K of the rounded 16 bits are subjected to multiplication by the multiplier 30 (Step S25). Multiplication results D30 of 32 bits are sent to the digit adjuster 40. The digit adjuster 40 shifts the multiplication results D30 to the left on the basis of the shift information SHIFT respectively stored in the memory areas 21-1 through 21-K to adjust digits (Step S26) and outputs output data OUT, after which the multiplication processing is terminated (Step S27).

Advantageous Effects of First Embodiment

According to the first embodiment, the following effects of (1) through (4) are brought about.

(1) Since the rounding processing is contrived, the accuracy of each computational result can be ensured.

(2) Since the 16-bit multiplier 30 can be used, for example, a processor capable of executing a 16-bit sum-of-products computation at high speed can be speeded up.

(3) Adjusting the number of bits (n bits) of each bit field C to be ensured makes it possible to ensure accuracy consistent or matched with an application.

Figure 6:
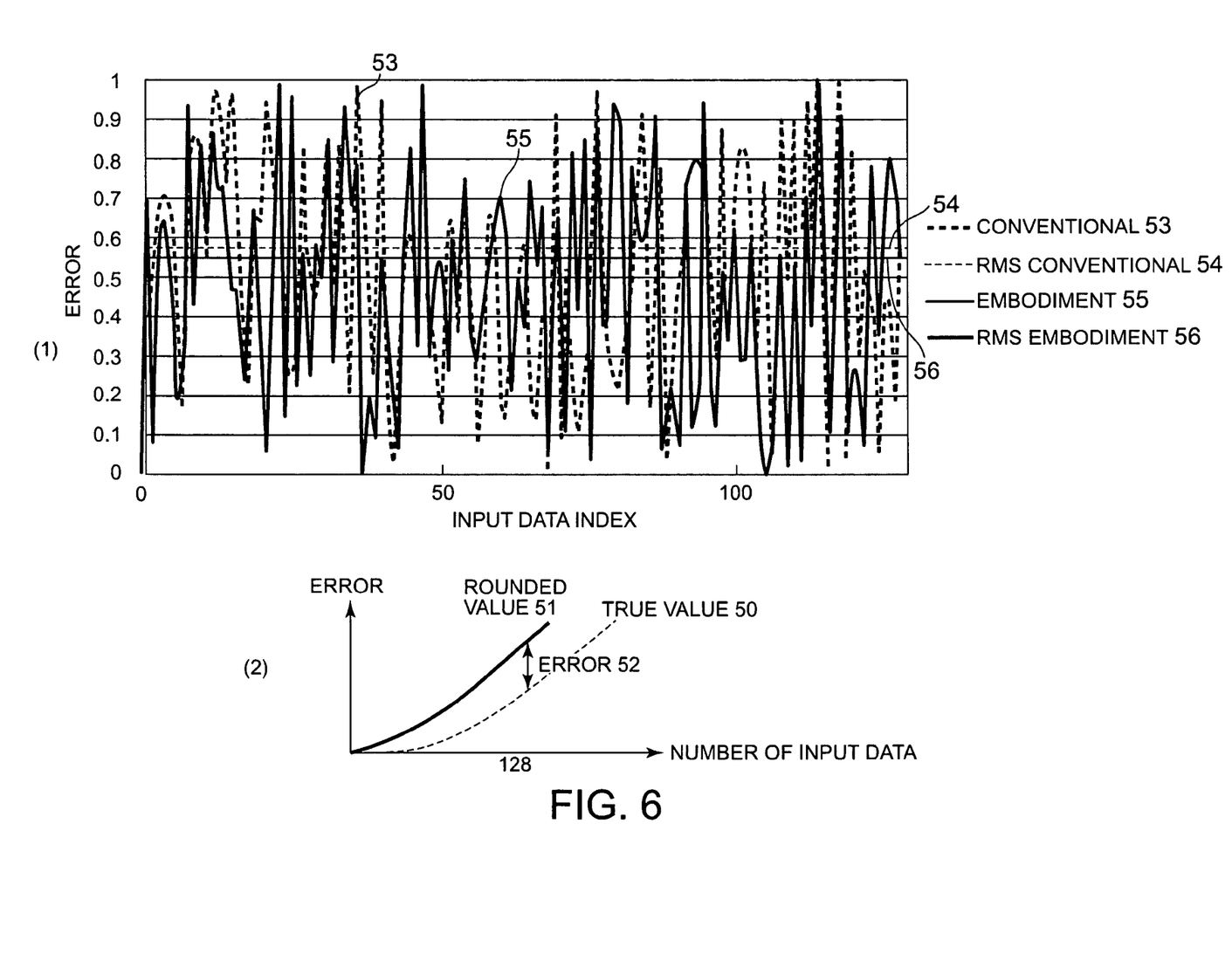
FIG. 6 is a diagram showing comparisons between computational accuracy according to the embodiment of the present invention and computational accuracy according to the prior art.

(4) FIGS. 6(1) and 6(2) are diagrams showing comparisons between computational accuracy of the embodiment of the present invention and computational accuracy of the prior art. The same FIG. (1) is a diagram showing compared simulation results, and the same FIG. (2) is a diagram showing how to determine the computational accuracy of the same FIG. (1).

When the computational accuracy (i.e., rounding error) is determined as shown in FIG. 6(2), a plurality of (e.g., 128)

input data IN1 through INK are inputted to the computing device, where an error 52 between a true value 50 of each computational result and a rounded value 51 is determined and the means value of the error 52 may be determined. The means value of the error 52 can be expressed in the following RMS (root-mean-square value VRMS).

$$V_{RMS} = \sqrt{\frac{1}{T} \cdot \int_{\Delta t = T} V(t)^2 \cdot dt}$$

where
t: index of input data
v(t): error
T: number of input data

The simulation results of FIG. 6(1) are ones obtained by comparing the accuracy (RMS conventional linear curve 54) of (conventional curve 53) where upper 16 bits are ensured, and the accuracy (linear curve 56 of RMS embodiment) of (curve 55 of the first embodiment) where the first embodiment of the present invention is used. As an example, 32-bit input values of 128 samples are respectively rounded to 16-bit values to show errors relative to the 32-bit input values. According to the simulation results, it is understood that the computational accuracy of the present embodiment is smaller in error than the conventional computational accuracy and high in the degree of accuracy from the RMS conventional linear curve 54 and the linear curve 56 of the RMS embodiment.

Second Preferred Embodiment

Configuration of Second Embodiment

Figure 7:
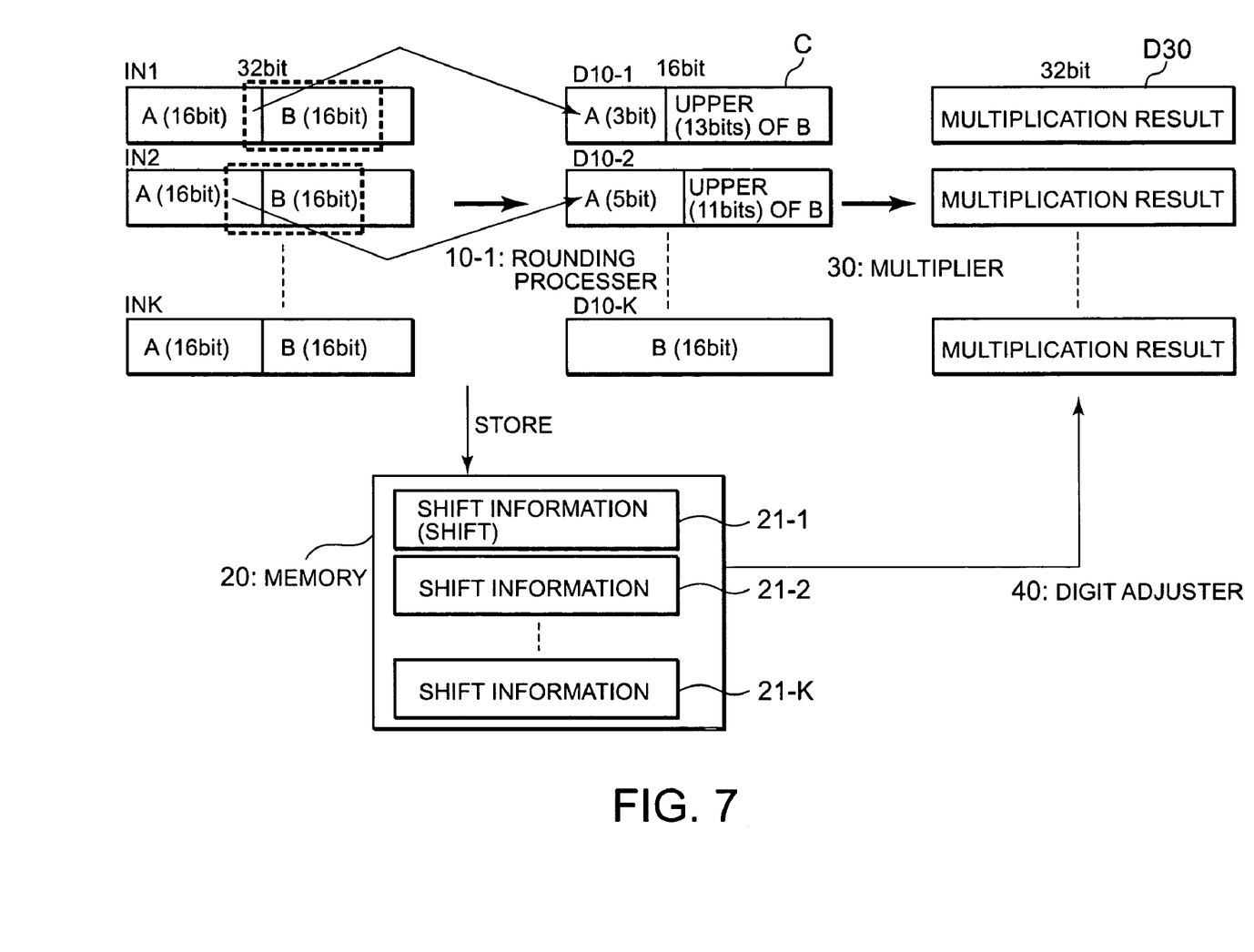
FIG. 7 is a diagram showing the contents of processing of a computing device according to a second embodiment of the present invention.

FIG. 7 is a diagram showing the contents of processing of a computing device according to a second embodiment of the present invention. Constituent elements common to those in FIG. 1(2) illustrative of the first embodiment are given common reference numerals respectively.

The computing device according to the second embodiment comprises a rounding processing means (e.g., rounding processor) 10-1 different in processing contents from that of the first embodiment, a memory means (e.g., memory) 20 similar to that of the first embodiment, a z/2 bit (e.g., 18-bit) multiplier 30, and a digit adjusting means (e.g., digit adjuster) 40.

The rounding processor 10-1 has the function of dynamically varying a secured bit field C on a data individual basis depending upon the state of use of each of specific areas A of upper z/2 bits of respective 32-bit input data IN1 through INK and rounding it to z/2 (e.g., 16 bits). That is, the rounding processor 10-1 has the function of determining how many bits the specific area A of upper n bits use with respect to each of the input data IN1 through INK and discarding upper (z/2−x) bits of specific areas A and lower x bits of non-specific areas B if x bits (0≦x≦z/2) are used, and selecting a bit field C to be ensured and rounding it to 16-bit values.

In a manner similar to the first embodiment, information about bit widths discarded upon rounding are stored in memory areas 21-1 through 21-K corresponding to the number of data prepared in the memory 20 as shift information SHIFT. The respective information are used to shift and adjust the digits of multiplication results multiplied by the multiplier 30 by means of the digit adjuster 40.

(Multiplication Processing Including Rounding Computing Method According to Second Embodiment)

Figure 8:
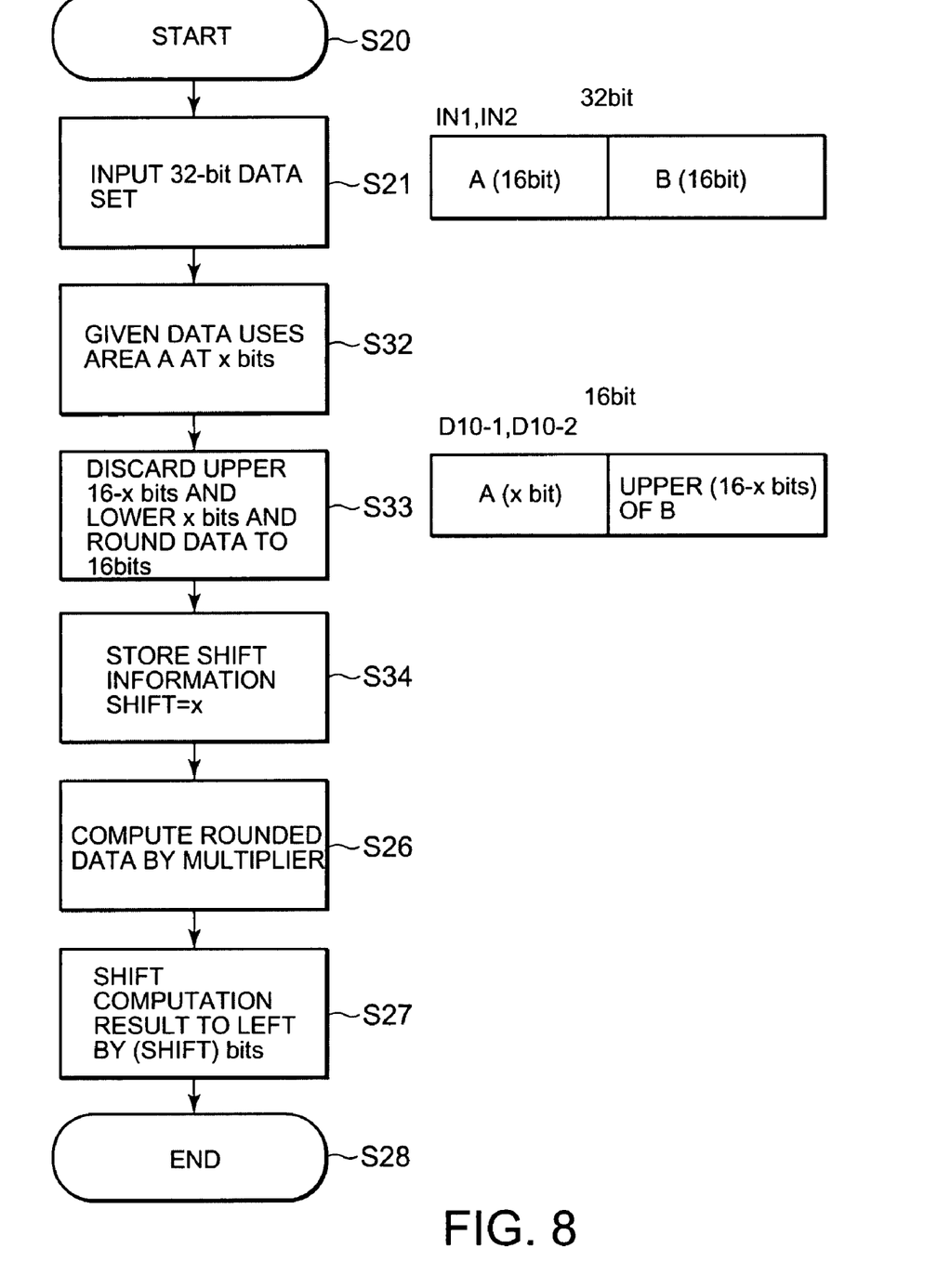
FIG. 8 is a flowchart showing multiplication processing including a rounding computing method of FIG. 7.

FIG. 8 is a flowchart showing multiplication processing including the rounding computing method of FIG. 7. Constituent elements common to those shown in FIG. 5 illustrative of the first embodiment are given common reference numerals respectively.

The multiplication processing for the set of the 32-bit input data IN1 through INK is executed in the following manner in accordance with the flowchart of FIG. 8.

When the multiplication processing is started (Step S20) and the set of 32-bit input data IN1 through INK is inputted to the rounding processor 10-1 (Step S21), the rounding processor 10-1 determines at what bits (x bits) each of given input data (e.g., IN1 and IN2) uses a specific area A of upper z/2 bits (e.g., 16 bits) (Step S32). Assuming that each of the input data (e.g., IN1 and IN2) makes use of the specific area A at x bits (0≦x≦16), the rounding processor 10-1 discards upper (16−x) bits of specific areas A and lower x bits of non-specific areas B, and selects a bit field C to be ensured and rounds it to 16-bit values (Step S33).

When, for example, the input data IN1 makes use of the x (=3) bits in each specific area A, upper (160−x=13) bits of the specific area A and lower x (=3) bits of its corresponding non-specific area B are discarded and the input data is rounded to 16-bit values. When the input data IN2 uses x (=5) bits in a specific area A, upper (16−x=11) bits of the specific area A and lower x (=5) bits of its corresponding non-specific area B are discarded and the input data is rounded to 16-bit values.

As a result of the rounding processing, shift information SHIFT about the discarded lower x bits of non-specific areas B are stored in their corresponding memory areas 21-1 and 21-2 (Step S34). Other input data IN3 through INK are also subjected to rounding processing in like manner. Since the memory areas 21-1 through 21-K are prepared by the number corresponding to the input data IN1 through INK in a manner similar to the first embodiment, shift information SHIFT associated with the respective input data IN1 through INK are individually stored in their corresponding memory areas 20-1 through 20-K.

Data D10-1 through D10-K of the rounded 16 bits are subjected to multiplication by the multiplier 30 in a manner similar to the first embodiment (Step S25). Multiplication results D30 of 32 bits are sent to the digit adjuster 40. The digit adjuster 40 shifts the multiplication results D30 to the left on the basis of the shift information SHIFT respectively stored in the memory areas 21-1 through 21-K to adjust digits (Step S26), after which the multiplication processing is terminated (Step S27).

Advantageous Effects of Second Embodiment

According to the second embodiment, effects similar to the effects (1) and (2) of the first embodiment are brought about. Further, the following advantageous effect (4) is brought about.

(4) Dynamically varying the number of bits to be ensured makes it possible to ensure accuracy allowable for the number of bits. It is therefore possible to improve the accuracy of each computational result by the multiplier 30 as compared with the first embodiment. As to it, simulation results similar to FIG. 6 showed that the accuracy could be improved as compared with the first embodiment.

Third Preferred Embodiment

Configuration of Third Embodiment

Figure 9:
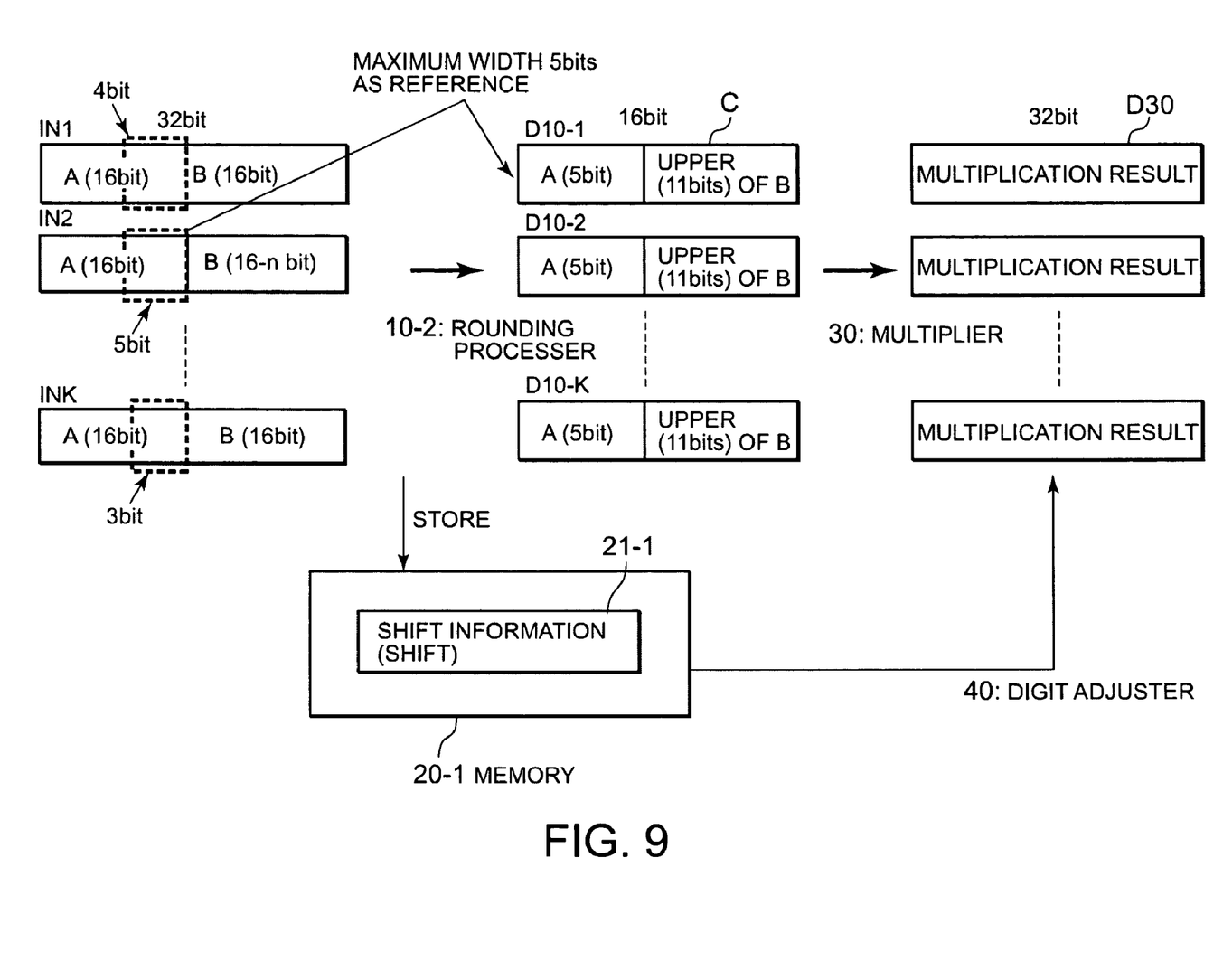
FIG. 9 is a diagram illustrating the contents of processing of a computing device according to a third embodiment of the present invention.

FIG. 9 is a diagram showing the contents of processing of a computing device according to a third embodiment of the present invention. Constituent elements common to those in FIG. 1(2) illustrative of the first embodiment are given common reference numerals respectively.

The computing device according to the third embodiment comprises a rounding processing means (e.g., rounding processor) 10-2 different in processing contents from that of the first embodiment, a memory means (e.g., memory) 20-1 different in storage capacity from that of the first embodiment, a z/2 bit (e.g., 18-bit) multiplier 30 similar to that of the first embodiment, and a digit adjusting means (e.g., digit adjuster) 40.

The rounding processor 10-2 has the function of dynamically varying a secured bit field C depending upon the state of use of each of specific areas A of upper z/2 bits (e.g., 16 bits) of respective z-bit (e.g., 32-bit) input data IN1 through INK and rounding it to z/2 (e.g., 16 bits). That is, the rounding processor 10-2 has the function of detecting how many bits specific areas A of respective upper n bits (e.g., 16 bits) of the plural input data IN1 through INK use, thereby to determine the maximum value x (where $0 \leq x \leq z/2$) of the used number of bits and discarding upper (z/2−x) bits and lower x bits in the input data IN1 through INK and rounding the data to z/2 bits respectively.

Information about the bit widths discarded upon rounding are stored in a memory area 21-1 lying in the memory 20-1 as shift information SHIFT. The shift information SHIFT are held every calculation unit (data set) of data and used to shift and adjust digits of multiplication results multiplied by the multiplier 30 by means of the digit adjuster 40.

(Multiplication Processing Including Rounding Computing Method According to Third Embodiment)

Figure 10:
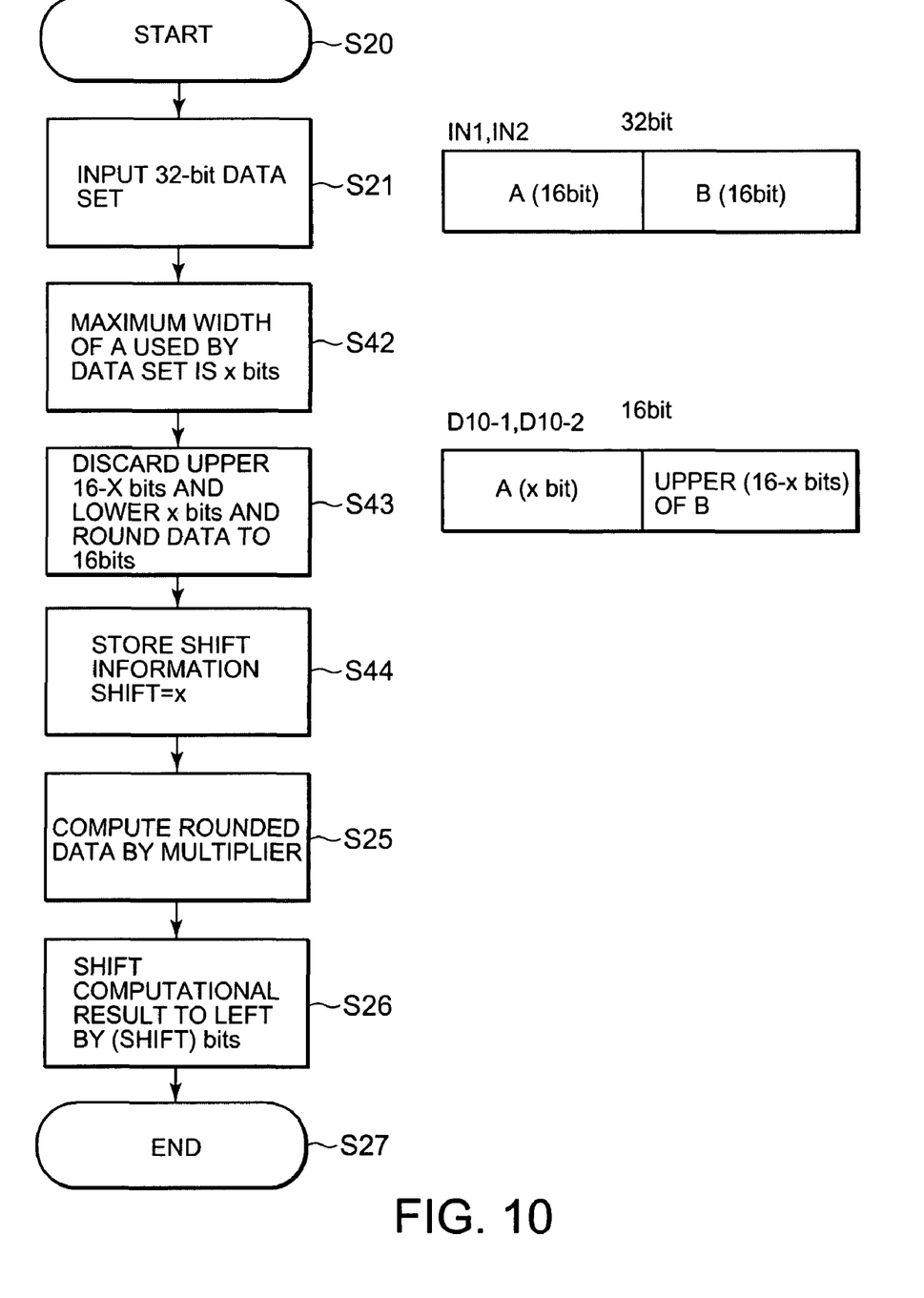
FIG. 10 is a flowchart showing multiplication processing including a rounding computing method of FIG. 9.

FIG. 10 is a flowchart showing multiplication processing including the rounding computing method of FIG. 9. Constituent elements common to those shown in FIG. 5 illustrative of the first embodiment are given common reference numerals respectively.

The multiplication processing for the set of the 32-bit input data IN1 through INK is executed in the following manner in accordance with the flowchart of FIG. 10.

When the multiplication processing is started (Step S20) and the set of 32-bit input data IN1 through INK is inputted to the rounding processor 10-2 (Step S21), the rounding processor 10-2 detects at what bits each of the input data IN1 through INK of z-bit (32-bit) lengths corresponding to a data set makes use of a specific area A of upper z/2 bits (e.g., 16 bits) (Step S42). Assuming that the maximum value of the used number of bits is x bits ($0 \leq x \leq 16$), upper (16−x) bits and lower x bits in the respective input data IN1 through INK are discarded, and each bit field C to be ensured is selected and rounded to 16-bit values (Step S43).

When, for example, the input data IN1 uses x (=4) bits in the specific area A, the input data IN2 uses 5 bits, and the input data INK uses 3 bits, the maximum value of the used number of bits becomes 5 bits. Therefore, the upper (16−x=11) bits and lower x (=5) bits in the respective input data IN1 through INK are discarded and each individual input data is rounded to 16-bit values.

As a result of the rounding processing, shift information SHIFT about lower x (=5) bits of non-specific areas B discarded in the respective input data IN1 through INK are stored in the memory area 21-1 (Step S44). The discarded number of bits (=5) is common between the respective input data IN1 through INK corresponding to the data set. Therefore, one memory area 21-1 is prepared and used in common between the respective data.

Data D10-1 through D10-K of the rounded 16 bits are subjected to multiplication by the multiplier 30 in a manner similar to the first embodiment (Step S25). Multiplication results D30 of 32 bits are sent to the digit adjuster 40. The digit adjuster 40 shifts the multiplication results D30 to the left on the basis of the shift information SHIFT stored in the memory area 21-1 to adjust digits (Step S26), after which the multiplication processing is terminated (Step S27).

Advantageous Effects of Third Embodiment

According to the third embodiment, effects similar to the effects (1) and (2) of the first embodiments are brought about. Further, the following advantageous effect (5) is brought about.

(5) Since shift information SHIFT are collectively managed every calculation unit, memory capacity can be reduced as compared with the second embodiment. As to it, simulation results similar to FIG. 6 showed that the accuracy in between the first embodiment and the second embodiment could be ensured.

Modifications

The present invention is not limited to the first through third embodiments. Various usage forms and modifications are possible. As the usage forms and modifications, the following (I) and (II) are cited by way of example.

(I) The number of bits for each of the rounding processors 10, 10-1 and 10-2, multipliers 30 and digit adjusters 40 that constitute the computing devices is arbitrary. Further, these computing devices may be changed to other configurations other than ones illustrated in the figures.

(II) While decoding of MP3 is taken for instance in each of the first through third embodiments, the present invention makes it possible to ensure accuracy in various applications that need to round data for the purpose of speeding-up of computation using the multiplier 30 and the like.

What is claimed is:

1. A computing device comprising:
rounding processing means for inputting therein multiplier factors and multiplicands respectively constituted of z bits (where $z \geq 2$), determining whether specific areas of respective upper n bits (where $z > n \geq 2$) of the multiplier factors and the multiplicands are respectively being used, discarding the upper n bits and lower (z/2-n) bits in the multiplier factors and the multiplicands, if the specific areas are not used and rounding the corresponding multiplier factors and multiplicands to z/2 bits respectively, and discarding lower z/2 bits in the multiplier factors and the multiplicands, if the specific areas are used and rounding the corresponding multiplier factors and multiplicands to z/2 bits respectively;

memory means for storing information about the discarded respective numbers of bits respectively;

a z/2-bit multiplier for performing multiplication on the multiplier factors and multiplicands rounded by the rounding processing means and outputting multiplication results therefrom; and digit adjusting means for shifting the multiplication results on the basis of the number-of-bits information stored in the memory means to adjust digits.

2. A computing device comprising:

rounding processing means for inputting therein multiplier factors and multiplicands respectively constituted of z bits (z≧2), determining at what bits specific areas of respective upper z/2 bits of the multiplier factors and the multiplicands are being used, discarding upper (z/2-x) bits and lower x bits in the multiplier factors and the multiplicands, if the specific areas use x bits (where 0≦x≦2), and rounding the corresponding multiplier factors and multiplicands to z/2 bits respectively;

memory means for storing information about the discarded respective numbers of bits therein respectively;

a z/2-bit multiplier for performing multiplication on the multiplier factors and multiplicands rounded by the rounding processing means and outputting multiplication results therefrom; and digit adjusting means for shifting the multiplication results on the basis of the number-of-bits information stored in the memory means to adjust digits.

3. A computing device comprising:

rounding processing means for inputting therein a plurality of multiplier factors and multiplicands respectively constituted of z bits (where z≧2), detecting at what bits specific areas of respective upper z/2 bits of the plurality of multiplier factors and multiplicands are being used, thereby determining the maximum value x (where 0≦x≦z/2) of the used number of bits, discarding upper (z/2-x) bits and lower x bits in the multiplier factors and the multiplicands and rounding the corresponding multiplier factors and multiplicands to z/2 bits respectively;

memory means for storing information about the discarded respective numbers of bits therein respectively;

a z/2-bit multiplier for performing multiplication on the multiplier factors and multiplicands rounded by the rounding processing means and outputting multiplication results therefrom; and digit adjusting means for shifting the multiplication results on the basis of the number-of-bits information stored in the memory means to adjust digits.

\* \* \* \* \*